US007078462B2

(12) United States Patent
Speed et al.

(10) Patent No.: US 7,078,462 B2
(45) Date of Patent: Jul. 18, 2006

(54) CLEANING PRODUCT

(75) Inventors: Lynda Anne Speed, Newcastle Upon Tyne (GB); Glenn Steven Ward, Newcastle Upon Tyne (GB)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 11/062,528

(22) Filed: Feb. 22, 2005

(65) Prior Publication Data

US 2005/0164897 A1 Jul. 28, 2005

Related U.S. Application Data

(63) Continuation of application No. 10/145,227, filed on May 14, 2002, now Pat. No. 6,956,016.

(30) Foreign Application Priority Data

May 14, 2001 (GB) ................................ 0111618.5
Apr. 9, 2002 (GB) ................................ 0208097.6

(51) Int. Cl.
*C08F 16/06* (2006.01)
*C11D 10/00* (2006.01)
*C11D 17/00* (2006.01)

(52) U.S. Cl. ........................ 525/60; 510/296; 510/439; 510/473; 510/475; 524/186; 524/236; 524/503; 524/557; 525/56; 525/63; 525/61; 527/300; 527/314; 383/1; 264/545

(58) Field of Classification Search ................ 510/296, 510/439, 475, 473; 524/503, 557, 186, 236; 525/56, 61; 527/300, 314
See application file for complete search history.

(56) References Cited

U.S. PATENT DOCUMENTS 4,108,600 A 8/1978 Wong
4,115,292 A 9/1978 Richardson et al.
4,765,916 A 8/1988 Ogar, Jr. et al.
4,801,636 A * 1/1989 Smith et al. ................ 524/236
4,806,261 A 2/1989 Ciallella et al.
4,846,992 A 7/1989 Fonsny
4,886,615 A 12/1989 Dehan
5,004,556 A 4/1991 Julemont et al.
5,294,361 A 3/1994 Van den Brom
5,453,216 A 9/1995 Kellett
5,830,548 A 11/1998 Anderson et al.
5,858,959 A 1/1999 Surutzidis et al.
6,048,830 A 4/2000 Gallon et al.
6,245,732 B1 6/2001 Gallon et al.
6,274,538 B1 8/2001 Addison
6,303,561 B1 10/2001 Painter
6,358,911 B1 3/2002 Metzger-Groom
6,391,845 B1 5/2002 Speed et al.
6,395,701 B1 5/2002 Connor et al.
6,399,564 B1 6/2002 Speed et al.
6,451,754 B1 9/2002 Rowland et al.
6,462,007 B1 10/2002 Pieroni et al.
6,465,413 B1 10/2002 Hinton
6,475,977 B1 11/2002 Pfeiffer et al.
6,486,116 B1 11/2002 Hinton
6,486,117 B1 11/2002 Painter et al.
6,492,312 B1 12/2002 Pfeiffer et al.
2002/0010123 A1* 1/2002 Schmiedel et al. ......... 510/446
2002/0077264 A1 6/2002 Roberts et al.
2002/0108184 A1 8/2002 Pettifer et al.
2002/0142931 A1 10/2002 DeNome et al.
2002/0169092 A1 11/2002 Alexandre et al.
2002/0169095 A1 11/2002 Forth et al.
2002/0187910 A1 12/2002 Speed et al.
2002/0187916 A1 12/2002 Pfeiffer et al.

FOREIGN PATENT DOCUMENTS

EP 9 132 726 2/1985
EP 0284191 A2 9/1988
EP 0337568 A2 10/1989
EP 0 481 547 A1 4/1992
EP 0284191 B1 8/1992
EP 0700318 B1 7/1997
EP 0 851 024 A2 7/1998
EP 0913462 A1 5/1999
EP 0922756 A1 6/1999
EP 1090980 A1 4/2001
EP 1090981 A1 4/2001
EP 1113071 A2 7/2001
EP 0922756 B1 9/2001
EP 1134281 A1 9/2001
EP 1160311 A2 12/2001
EP 1162258 A2 12/2001
EP 1184450 A2 3/2002
EP 1201741 A1 5/2002
EP 1201742 A1 5/2002
EP 1201743 A1 5/2002
EP 1201744 A1 5/2002
EP 1201745 A1 5/2002
EP 0960188 B1 6/2002
EP 0958347 B1 9/2002
EP 1121410 B1 9/2002
EP 0960187 B1 10/2002
EP 1260578 A1 11/2002
EP 1262539 A1 12/2002
EP 1314652 A1 5/2003
EP 1314653 A1 5/2003
EP 1032642 B1 7/2003
EP 1134281 B1 10/2003
WO WO9304120 A1 3/1993

(Continued)

*Primary Examiner*—Gregory R. Del Cotto
(74) *Attorney, Agent, or Firm*—Kevin L. Waugh; Jerry J. Yetter; Laura R. Grunzinger

(57) ABSTRACT

An automatic laundry or dishwashing product in unit dose form comprising at least three distinct zones for delivering into at least three different stages in the washing cycle. The product provides improved cleaning, care and finishing benefits.

2 Claims, No Drawings

FOREIGN PATENT DOCUMENTS

| | | | |
|---|---|---|---|
| WO | WO9423852 | A1 | 10/1994 |
| WO | WO9711151 | A1 | 3/1997 |
| WO | WO9734981 | A1 | 9/1997 |
| WO | WO9734982 | A1 | 9/1997 |
| WO | WO9830670 | A2 | 7/1998 |
| WO | WO9841607 | A1 | 9/1998 |
| WO | WO9906522 | A1 | 2/1999 |
| WO | WO9920722 | A2 | 4/1999 |
| WO | WO9923196 | A1 | 5/1999 |
| WO | WO9924547 | A1 | 5/1999 |
| WO | WO9924548 | A1 | 5/1999 |
| WO | WO9927063 | A1 | 6/1999 |
| WO | WO9927064 | A1 | 6/1999 |
| WO | WO9927067 | | 6/1999 |
| WO | WO9927068 | A1 | 6/1999 |
| WO | WO9927069 | A1 | 6/1999 |
| WO | WO9937746 | A1 | 7/1999 |
| WO | WO0002980 | A2 | 1/2000 |
| WO | WO 00006668 | | 2/2000 |
| WO | WO 00006684 | | 2/2000 |
| WO | WO0041522 | A2 | 7/2000 |
| WO | WO0104258 | A1 | 1/2001 |
| WO | WO0105755 | A1 | 1/2001 |
| WO | WO0123510 | A2 | 4/2001 |
| WO | WO0140420 | A2 | 6/2001 |
| WO | WO0151600 | A1 | 7/2001 |
| WO | WO0160966 | A1 | 8/2001 |
| WO | WO0183658 | A2 | 11/2001 |
| WO | WO0183661 | A1 | 11/2001 |
| WO | WO0183667 | A1 | 11/2001 |
| WO | WO0185888 | A2 | 11/2001 |
| WO | WO0185892 | A1 | 11/2001 |
| WO | WO0185898 | A1 | 11/2001 |
| WO | WO0196514 | A1 | 12/2001 |
| WO | WO0200994 | A1 | 1/2002 |
| WO | WO0202730 | A1 | 1/2002 |
| WO | WO0206438 | A1 | 1/2002 |
| WO | WO0208380 | A1 | 1/2002 |
| WO | WO0238722 | A2 | 5/2002 |
| WO | WO0242407 | A2 | 5/2002 |
| WO | WO0242408 | A2 | 5/2002 |
| WO | WO0250240 | A1 | 6/2002 |
| WO | WO02057460 | A2 | 7/2002 |
| WO | WO02074891 | A2 | 9/2002 |
| WO | WO02074892 | A1 | 9/2002 |
| WO | WO02074893 | A1 | 9/2002 |
| WO | WO02092751 | A2 | 11/2002 |

* cited by examiner

CLEANING PRODUCT

CROSS REFERENCE TO RELATED APPLICATION

This application is a continuation application of U.S. application Ser. No. 10/145,227, filed May 14, 2002 now U.S. Pat. No. 6,956,016. This application claims the benefit of GB 02008097.6, filed Apr. 9, 2002; and GB 0111618.5, filed May 14, 2001.

TECHNICAL FIELD

The present invention is in the field of automatic washing, in particular it relates to washing products in unit dose form comprising a plurality of zones adapted to release different compositions in different cycles of the washing process. The products provide excellent cleaning and finishing benefits.

BACKGROUND OF THE INVENTION

Two of the unsolved problems in the field of automatic dishwashing are those of cleaning tough food residues and of preventing filming and spotting of washed articles, especially glass and plastic articles. Filming and spotting are believed to occur, among other reasons, due to the formation of insoluble salts resulting from the combination between the ions generated from the dishwashing detergent and the ions present in the dishwasher water. Food soils also play a significant role in causing filming and spotting. Traditionally, this problem has been ameliorated by the use of salt in order to soften the water (that is to reduce the concentration of cations, specially $Ca^{2+}$ and $Mg^{2+}$) and by the use of rinse aid containing sequestrant, dispersant and surfactant which to some extent help to control the hardness of the ions present in the water and to reduce the surface tension of the dishwashing liquor, thus avoiding the formation of liquid droplets and allowing uniform drying of the washed utensils, ameliorating filming and spotting issues.

However, some consumers do not use salt or rinse aid or the water is so hard that salt and rinse aid are not enough to overcome filming and spotting problems. Moreover, the problem of food soils and removal of tough food residues still remains a significant issue.

Typically, the machine dishwashing process involves the steps of dosing detergent into the dispenser at the beginning of each wash and filling the salt and rinse aid reservoirs at intervals as required. Some users may find it inconvenient to carry out all these steps and prefer a simpler process involving the use of a single product performing all the functions required for the dishwashing process. Unitised doses of dishwashing detergents are found to be more attractive and convenient to some consumers, additionally they avoid the need of the consumer to measure the product thereby giving rise to a more precise dosing and avoiding wasteful overdosing or underdosing. For this reason automatic dishwashing detergent products in tablet form have become very popular. Detergent products in pouch form are also known in the art.

Rinse aid compositions need to be stored in the rinse reservoir inside the dishwasher, usually during many cycles and therefore subject to the temperature changes associated with the dishwashing process. Thus rinse aid compositions need to be very stable in order to withstand these temperature changes without affecting their physical form and/or chemical structure. This usually requires the use of very dilute compositions, which limits even further the amount of actives that can be delivered into the rinse cycle.

Some attempts have been made to provide controlled delivery of rinse aid. For example WO-A-00/6684 and WO-A-00/6688 describe a multi-phase tablet comprising a particle which comprises a core and a coating. The substances present in the core are active during the rinse cycle and the coating comprises at least one compound whose solubility increases with a declining concentration of a specific ion in the surrounding medium. WO-A-99/27067 describe a multi-phase tablet with a compressed and non-compressed portion where the non-compressed portion does not dissolve until the rinse cycle. EP-A-851,024 describes a multi-layer tablet, having a first layer for delivery into the main-wash and a second layer comprising a substance which has a melting point between 55° C. and 70° C. and which is substantially delivery into the rinse cycle. However, the tablets described in WO '84, WO '88, WO '67 and EP '24 only deliver actives into one of the rinses cycles and are not capable of selectively delivering different compositions into different rinse cycles.

U.S. Pat. No. 5,453,216 describes the delivery of actives in the rinse cycle by means of coated particles. The particles, which are introduced into the pre-wash and into main-wash cycles, comprise a core comprising an inorganic builder salt and a waxy coating having a melting point above 65° C. Particles are said to have a diameter from about 1 to about 2.5 mm. As such, it seems likely that a large proportion of the particles will be flushed away with the main wash liquor at the end of the main wash cycle.

WO 01/96514 relates to a mechanical dishwashing composition comprising an anti-scaling polymer and a vehicle releasing at least an effective amount of the polymer into a penultimate and/or final rinse of a dishwashing cycle.

Some detergent ingredients used in dishwashing detergent compositions are liquids. These liquid ingredients can be difficult or costly to include in a solid detergent composition. Also, certain ingredients are preferably transported and supplied to detergent manufacturers in a liquid form and require additional, and sometimes costly, process steps to enable them to be included in a solid detergent composition. An example of these detergent ingredients are surfactants, especially nonionic surfactants which are typically liquid at room temperature or are typically transported and supplied to detergent manufacturers in liquid form. Another example are organic solvents. It would be advantageous to have a detergent composition which allows the different ingredients to be in their natural state i.e., liquid or solid.

The majority of automatic dishwashers have wash programs which last at least one hour but only a relatively small proportion of the total wash program is devoted to active detersive cleaning (i.e. the main-wash cycle, which lasts for about 20 min, and possibly the pre-wash) and only a relative small portion of the final rinse cycle (determined by the dishwasher design) is devoted to chemical finishing. These times do not seem to be sufficient for achieving a satisfactory removal of tough food residues and preventing filming and spotting, however delivery programs are fixed parameters determined by dishwashing machine manufacturers and the user has no control over them.

In view of the above there is still a need for improving tough food cleaning whilst reducing filming and spotting, especially in those instances where users wish to avoid or limit the use of salt and/or rinse aid and in the case of dishwashing under hard water conditions.

SUMMARY OF THE INVENTION

An automatic dishwashing operation typically comprises three or more cycles: a pre-wash cycle, a main-wash cycle and one or more rinse cycles. In Europe, the pre-wash cycle, when used, is typically a cold water cycle lasting about 6 or 7 min. In the main-wash cycle the water comes in cold and is heated up to about 55 or 65° C., the cycle lasting about 20 min. Rinsing usually comprises two or more separate cycles following the main wash, the first being cold and lasting between about 2 and 5 min, the final one starting cold with heat-up to about 65° C. or 70° C. and lasting about 20 min. The dishwashing machine is filled with cold water at the start of each cycle and emptied at the end of each cycle through a filter. A typical dishwashing machine is designed for the delivery of from about 20 to about 40 grams of detergent from the dispenser into the main-wash and from about 2 to about 6 ml of rinse aid at or towards the end of the final rinse cycle. In the U.S. the pre-wash may itself be followed by a separate rinse cycle prior to the main-wash. For purposes of the invention the term rinse is restricted to rinse cycles following the main-wash.

According to a first aspect of the invention there is provided an automatic laundry or dishwashing product in unit dose form comprising at least three distinct zones including a primary cleaning zone, a secondary cleaning zone and a finishing zone and wherein in use in an automatic laundry or dishwashing machine having a main-wash cycle and a plurality of post main-wash rinse cycles, the primary cleaning zone releases a primary cleaning composition into the main wash, the secondary cleaning zone releases a secondary cleaning composition into a pre-final rinse, preferably the first rinse, and the finishing zone releases a finishing composition into the final rinse.

The product of the invention allows for flexible formulation, permitting, for example, the separation of mutually-incompatible ingredients either on storage or in the wash liquor and the separation of ingredients in different physical forms; it also allows for sequential controlled release, i.e, allows for the releasing of different products into different cycles providing an optimisation of the washing process. The addition of a secondary cleaning composition permits the delivery of ingredients having a different cleaning mechanism to the primary cleaning composition, providing extra-cleaning by removing any remaining residues left after the main-wash. The product of the invention also allows for an optimisation of the finishing process, even without the use of salt or rinse aid, firstly because the cleaned articles present less spotting than when washed with a single detergent during the main-wash and secondly because the product of the invention can deliver more chemistry for a longer period of time during the main wash and rinse cycles. Furthermore, the product of the invention provides care and protection of the dishware/tableware.

By primary and secondary cleaning compositions are herein meant compositions comprising automatic cleaning ingredients and/or auxiliaries. The primary and secondary cleaning compositions can be similar but preferably they are compositions having a complementary cleaning effect (e.g., first cleaning composition comprises detergency enzymes and second cleaning composition comprises chlorine bleach).

In a preferred embodiment, the primary cleaning zone is a high alkalinity cleaning zone, the secondary cleaning zone is a low alkalinity cleaning zone and the finishing zone is a neutral or acidic finishing zone, preferably the primary cleaning composition provides a wash liquor pH of about 10 or above, the secondary cleaning composition provides a wash liquor pH of from about 8 to about 9.5 and the finishing composition provides a wash liquor of about 5 or below. This combination of cleaning under different alkalinity conditions followed by acidic rinse provides excellent cleaning and finishing results.

In a preferred embodiment, the primary cleaning composition has a reserve alkalinity in the range from about 10 to about 20 g NaOH/100 g of product. "Reserve alkalinity", as used herein refers to, the ability of a composition to maintain an alkali pH in the presence of acid. This is relative to the ability of a composition to have sufficient alkali in reserve to deal with any added acid while maintaining pH. More specifically, it is defined as the grams of NaOH per 100 g of product, exceeding pH 9.5, in product. The reserve alkalinity for a solution is determined in the following manner.

A Mettler DL77 automatic titrator with a Mettler DG115-SC glass pH electrode is calibrated using pH 4, 7 and 10 buffers (or buffers spanning the expected pH range). A 1% solution of the composition to be tested is prepared in distilled water. The weight of the sample is noted. The pH of the 1% solution is measured and the solution is titrated down to pH 9.5 using a solution of 0.25N HCL. The reserve alkalinity (RA) is calculated in the following way:

$$RA = \%\ \text{NaOH} \times \text{Specific gravity}$$

$$\%\ \text{NaOH} = ml\ \text{HCl} \times \text{Normality of HCl} \times 40 \times 100 / \text{Weight of sample aliquot titrated } (g) \times 1000$$

Preferably the primary cleaning composition comprises carbonate and phosphate detergency builders in a ratio of from about 1:4 to about 5:1, preferably from about 1:2 to about 3:1, such compositions being optimum for cost and performance. The carbonate builder for use herein can be selected from alkali metal carbonates, sesquicarbonates, percarbonates and mixtures thereof, especially sodium carbonate. Preferably the primary cleaning composition also comprises alkali metal silicates in order to provide protection against corrosion of metals and against attack on dishware, including china and glassware or for machine protection. The compositions are preferably free of metasilicates.

The product of the invention permits the separation of mutually-incompatible ingredients either on storage and/or in use, such as for example enzymes and chlorine bleach. Thus, in a preferred embodiment the primary cleaning composition comprises a detergency enzyme. In another preferred embodiment the secondary cleaning composition comprises a bleaching agent, preferably a chlorine bleach and optionally a detergency builder, preferably a phosphate detergency builder. In a dishwashing application, the builder promotes the degradation of tough food soils such as for example lasagne and egg. Without wishing to be bound by theory, it is believed that these soils contain significant amount of calcium and therefore they can be degraded by builders. Chlorine bleach removes residual stains such a as tea and coffee, removes protein spots and promotes shine.

In still another preferred embodiment the primary cleaning composition comprises a detergency enzyme and at the same time, the secondary cleaning composition comprises a bleaching agent. This not only brings unique cleaning benefits but also permits the reduction of the levels of enzymes as compared with those used in traditional detergent without loss of performance. It is preferred that the primary cleaning composition comprises an oxygen bleach. Oxygen bleach forming part of the primary cleaning composition and therefore delivered into the main-wash and chlorine bleach forming part of the secondary cleaning composition and therefore delivered into a pre-final rinse, preferably the first rinse, synergistically complement each other boosting the overall bleaching performance of the product, even without using a bleach catalyst. Benefits can be seen, for example in the removal of black tea stains. Oxygen bleach in the main wash removes the bulk of the stain and chlorine bleach in the first rinse attacks the residual stain. This stain removal can be more efficient than when using higher amount of only one bleaching agent.

The main role of the finishing composition is to provide the cleaned articles with a good final feel, aesthetics and appearance, for example in the case of dishware/tableware, substantially free of filming and spotting and having a good gloss and shine. This can be achieved, for instance, by removing alkaline salt deposits formed during the main-wash and by promoting sheeting and uniform drying of the articles. In a preferred embodiment the finishing composition includes an acidity source selected from organo aminophosphonic acids and aminopolyphosphonic acids, organo phosphonic acids and polyphosphonic acids, carboxylic acids, polycarboxylic acids, sulfonic acids, polysulfonic acids and mixtures thereof. Preferably, the acidity source is a polycarboxylic acid especially citric acid. Preferably, the finishing composition also comprises a chlorine scavenger in order to provide care and protection to the dishware/tableware, especially to metallic and in particular silver articles.

In a preferred embodiment the finishing zone is enclosed within the secondary cleaning zone (which protects the finishing composition during the main wash) and the secondary cleaning zone is enclosed within the primary cleaning zone, alternatively, the finishing and the secondary cleaning zone can be enclosed within the primary cleaning zone. This second alternative can be favourable from the manufacturing viewpoint. The delivery of different compositions in different cycles can be achieved by including physical, chemical or mechanical trigger-means for releasing the primary cleaning, secondary cleaning and finishing compositions into the wash or rinse liquors. Trigger-means for the primary cleaning, secondary cleaning and finishing compositions serve to protect the different compositions of the product from dissolution before the desired moment and deliver each composition at a defined point in time. Preferably, the delivery of the different compositions is performed at optimum times in each cycle and in a discontinuous way (as opposed to slow delivery such as that provided by a detergent block or tablet) in order to provide the ingredients with an optimum working time. The trigger means are each responsive to one or more of temperature, pH, redox potential, ionic concentration, enzymatic reaction or time.

In a preferred embodiment each zone of the product has associated trigger means as follow:

i) the primary cleaning zone is associated with a temperature-dependent primary trigger, said primary cleaning trigger being responsive to a rise in temperature above a trigger temperature ($T_{prim}$). Preferably the trigger temperature, $T_{prim}$, is at least about 20° C., more preferably at least about 25° C. and especially at least about 28° C. with an optional trigger delay ($t_{prim}$) of less than about 4 min, preferably less than about 2;

ii) the secondary cleaning zone is associated with a primed inverse temperature-dependent secondary cleaning trigger, said secondary trigger being responsive to a fall in temperature below a trigger temperature ($T_{sec}$) and being primed to trigger by a rise in temperature above a trigger priming temperature ($T'_{sec}$) which is greater than $T_{sec}$. Preferably the secondary cleaning trigger has trigger temperature $T_{sec}$ of less than about 40° C., more preferably less than about 35° C., especially less than about 30° C. and a trigger priming temperature ($T'_{sec}$) of at least 40° C., preferably at least 45° C., more preferably at least 48° C.; and iii) the finishing zone is associated with a temperature-dependent finishing trigger, said finishing trigger being responsive to a rise in temperature above a trigger temperature ($T_{fin}$). Preferably the finishing trigger has a trigger temperature $T_{fin}$ of at least about 45° C., more preferably at least about 48° C., especially at least about 50° C. with an optional trigger delay ($t_{fin}$) of less than about 1 min, preferably less than about 30 sec.

The product of the invention permits a controlled release of the different compositions into the wash or rinse liquor at very well defined points of the washing or rinsing, maximizing the efficacy of each composition. In a preferred embodiment $T'_{sec}$ is greater than $T_{prim}$. In other preferred embodiments, $T_{fin}$ is greater or equal than $T'_{sec}$.

Temperature-dependent triggers preclude the delivery of the associated composition before the trigger temperature is reached. By "primed trigger" is meant a trigger which needs to be triggered by an additional trigger (priming trigger) before it can be activated itself. By "inverse temperature-dependent trigger" is meant a trigger which is activated by a fall in temperature below a given trigger temperature. By "trigger-delay" is meant a period of delay after the trigger-temperature is reached and before the trigger is activated. The trigger means can be selected from temperature solubility-dependent films (i.e. films having solubility characteristics dependent upon temperature), coatings, sprays-on, agglomerating materials, binding materials and mixtures thereof. The primary cleaning trigger serves to protect the primary composition during the pre-wash and to deliver it into the main-wash. The secondary cleaning trigger serves to protect the secondary composition during the main-wash and to deliver it during a pre-final rinse cycle, preferably during the first rinse. The finishing cleaning trigger serves to protect the primary composition during pre-final rinse cycles and to deliver it into the final rinse.

In a preferred embodiment the primary cleaning trigger is in the form of a film and the primary cleaning zone is in the form of a pouch or capsule. In use, the product can be placed within the washing machine dispenser and released during the main cycle of the washing process. The dispensers of some washing machines are not completely water tight, mainly for two reasons, either the dispenser has some apertures allowing water ingress or the dispenser is sealed with a rubber band that can deform with time due to the high wash temperature. Water ingress into the dispenser can cause premature leaking of some of the pouch content which is thus prematurely lost, for example in the case of dishwashing, at the end of the pre-wash. This problem is especially acute in the case of pouches comprising liquid compositions having a low viscosity wherein a considerable amount of the product can be lost before the main-wash cycle. Sometimes, it is useful to place the product outside the dispenser, for example, in order to avoid volume constraints. The problem of ingredient release before the main-wash can be overcome by using a primary trigger means which is not activated during the pre-wash (in European machines, the pre-wash is usually a cold water cycle (about 20° C. or less) without detergent and lasting for about 10 to 15 min) and is triggered at or after the start of the main-wash cycle.

The primary and secondary cleaning zones and the finishing zone can be in the form of a pouch, capsule, tablet or compact, the triggers can be in the form of a film or capsule wall and the compositions can be in the form of powder, compressed powder, liquid, liquid-solid suspension, gel or paste.

The primary cleaning composition can be in the form of powder, compressed powder, transparent or translucent liquid, liquid-solid suspension, gel or paste. Alternatively, the primary cleaning zone can be in the form of a coated tablet.

Preferably, the primary finishing zone is in the form of a pouch or capsule. It is also preferred that the secondary and the finishing zones are in the form of a pouch or capsule. Alternatively, the secondary and/or the finishing zones can be in the form of a compressed powder, wherein the trigger means are either coated on the surface of the compressed powder (for example by spraying or encapsulation techniques) or agglomerated into the compressed powder.

According to another aspect of the invention, there is provided an automatic laundry or dishwashing product in unit dose form comprising one or more zones, each comprising a detergent active or auxiliary, at least one zone having a primed, inverse-temperature trigger means associated with said zone for releasing the detergent active or auxiliary into the wash or rinse liquor. Preferably the zone having a primed, inverse-temperature trigger means associated comprises a bleaching agent, especially chlorine bleach.

The secondary zone can alternatively have a primed, physico-chemical trigger means. These means can make use of the different conditions found towards the end of the main-wash and at the beginning of a penultimate cycle. Useful physico-chemical trigger means are for example: i) electrolyte sensitive materials which are insoluble in the presence of high concentrations of ions (towards the end of the main-wash) but possess good solubility at low ionic concentration; and ii) pH sensitive materials which are insoluble at high pH (above 10) and soluble at pH below 9.

There is also provided a process for making the product of the invention comprising the steps of:

a) making a first pouch or capsule of a temperature-dependent trigger material, said pouch or capsule containing the finishing composition;
b) making a second pouch or capsule of a primed inverse temperature-dependent material, said pouch containing the secondary cleaning composition and the first pouch formed in step a; and
c) making a third pouch or capsule of a temperature-dependent trigger material including the primary cleaning composition and the second pouch or capsule formed in step b.

In another process embodiment, there is provided a process for making the product of the invention comprising the steps of:

a) making a coated compressed powder compact containing the finishing composition wherein the coating comprises temperature-dependent trigger material;
b) making a first pouch or capsule of a primed inverse temperature-dependent material, said pouch or capsule containing the secondary cleaning composition and the coated compressed powder compact formed in step a; and
c) making a second pouch or capsule of a temperature-dependent trigger material said pouch containing the primary cleaning composition and the first pouch formed in step b.

These processes are very versatile and flexible, they permit to modify the manufacture of each zone independently without affecting other parts of the process.

According to another aspect of the present invention, there is provided a polymeric material for use as primed inverse temperature-dependent means which is water insoluble at temperatures above about 40° C. and water soluble at temperatures below about 40° C. This enables dissolution of the polymeric material during the first rinse. It has been found that a polymeric material comprising an inverse solubility polymer and polyvinyl alcohol in a ratio of at least 1:1, preferably at least 2:1 and more preferably at least about 3:1 can fulfil the requirement of being insoluble above about 40° C. and water soluble at temperatures below about 40° C.

Preferred inverse solubility polymer for use herein are hydroxybutyl methylcellulose (HBMC), hydroxypropyl methylcellulose (HPMC) and mixtures thereof. Preferably, the polymeric material also comprises a cross-linking agent such as for example boric acid and a plasticider such as for example glycerol, in order to avoid brittleness in the film.

According to another aspect of the invention there is provided a method of washing cookware/tableware in an automatic dishwashing machine using the product of the invention. The product can be placed either in the dispenser or outside the dispenser, for example, cutlery basket, a net or on the floor of the machine, providing maximum convenience for the user and avoiding volume constriction from the formulation viewpoint. Also provided is a method of washing laundry in a laundry washing machine using the product of the invention.

The product of the invention is excellent for the removal of hot beverages stains such as for example tea and coffee stains, thus there is also provided a method of removing tea and coffee stains from cookware and tableware or from laundry articles comprising washing the cookware/tableware or laundry articles in an automatic dishwashing or laundry machine in the presence of the product of the invention. The product of the invention also provides excellent shine and care benefits on crockery, glass and/or plasticware and finishing benefits on laundry.

DETAILED DESCRIPTION OF THE INVENTION

The present invention envisages a washing product comprising different compositions for delivery at different times of the washing process. The products allows for a controlled delivery in various cycles of the washing and this is translated into excellent cleaning and finishing performances. The washed articles present excellent shine.

The ingredients described herein can be used in any of the three compositions of the product of the invention.

Surfactant

Preferably, the surfactant for use in the product of the present invention, especially when the product is used in automatic dishwashing, is a low foaming surfactant by itself or in combination with other components (i.e. suds suppressers). Surfactants preferably comprise part of the primary or secondary cleaning composition. Surfactants suitable herein include anionic surfactants such as alkyl sulfates, alkyl ether sulfates, alkyl benzene sulfonates, alkyl glyceryl sulfonates, alkyl and alkenyl sulphonates, alkyl ethoxy carboxylates, N-acyl sarcosinates, N-acyl taurates and alkyl succinates and sulfosuccinates, wherein the alkyl, alkenyl or acyl moiety is $C_5$–$C_{20}$, preferably $C_{10}$–$C_{18}$ linear or branched; cationic surfactants such as chlorine esters (U.S. Pat. No. 4,228,042, U.S. Pat. No. 4,239,660 and U.S. Pat. No. 4,260,529) and mono $C_6$–$C_{16}$ N-alkyl or alkenyl ammonium surfactants wherein the remaining N positions are substituted by methyl, hydroxyethyl or hydroxypropyl groups; low and high cloud point nonionic surfactants and mixtures thereof including nonionic alkoxylated surfactants (especially ethoxylates derived from $C_6$–$C_{18}$ primary alcohols), ethoxylated-propoxylated alcohols (e.g., BASF Poly-Tergent® SLF18), epoxy-capped poly(oxyalkylated) alcohols (e.g., BASF Poly-Tergent® SLF18B—see WO-A-94/22800), ether-capped poly(oxyalkylated) alcohol surfactants, and block polyoxyethylene-polyoxypropylene polymeric compounds such as PLURONIC®, REVERSED PLURONIC®, and TETRONIC® by the BASF-Wyandotte Corp., Wyandotte, Mich.; amphoteric surfactants such as the $C_{12}$–$C_{20}$ alkyl amine oxides (preferred amine oxides for use herein include $C_{12}$ lauryldimethyl amine oxide, $C_{14}$ and $C_{16}$ hexadecyl dimethyl amine oxide), and alkyl amphocarboxylic surfactants such as Miranol™ C2M; and zwitterionic surfactants such as the betaines and sultaines; and mixtures thereof. Surfactants suitable herein are disclosed, for example, in U.S. Pat. No. 3,929,678, U.S. Pat. No. 4,259,217, EP-A-0414 549, WO-A-93/08876 and WO-A-93/08874. Surfactants are typically present at a level of from about 0.2% to about 30% by weight, more preferably from about 0.5% to about 10% by weight, most preferably from about 1% to about 5% by weight of the total composition. Preferred surfactant for use herein are low foaming and include low cloud point nonionic surfactants and mixtures of higher foaming surfactants with low cloud point nonionic surfactants which act as suds suppresser therefor. Other preferred surfactants, especially for use in the finishing composition are silicone surfactants, such as Silwet copolymers, preferred Silwet copolymers include Silwet L-8610, Silwet L-8600, Silwet L-77, Silwet L-7657, Silwet L-7650, Silwet L-7607, Silwet L-7604, Silwet L-7600, Silwet L-7280 and mixtures thereof. Preferred for use herein is Silwet L-77.

Builder

Builders suitable for use herein include water-soluble builders such as citrates, carbonates and polyphosphates e.g. sodium tripolyphosphate and sodium tripolyphosphate hexahydrate, potassium tripolyphosphate and mixed sodium and potassium tripolyphosphate salts; and partially water-soluble or insoluble builders such as crystalline layered silicates (EP-A-0164514 and EP-A-0293640) and aluminosilicates inclusive of Zeolites A, B, P, X, HS and MAP. The builder is typically present at a level of from about 1% to about 80% by weight, preferably from about 10% to about 70% by weight, most preferably from about 20% to about 60% by weight of composition.

Amorphous sodium silicates having an $SiO_2$:$Na_2O$ ratio of from 1.8 to 3.0, preferably from 1.8 to 2.4, most preferably 2.0 can also be used herein although highly preferred from the viewpoint of long term storage stability are compositions containing less than about 22%, preferably less than about 15% total (amorphous and crystalline) silicate.

Enzyme

Enzymes suitable herein include bacterial and fungal cellulases such as Carezyme and Celluzyme (Novo Nordisk A/S); peroxidases; lipases such as Amano-P (Amano Pharmaceutical Co.), M1 Lipase® and Lipomax® (Gist-Brocades) and Lipolase® and Lipolase Ultra® (Novo); cutinases; proteases such as Esperase®, Alcalase®, Durazym® and Savinase® (Novo) and Maxatase®, Maxacal®, Properase® and Maxapem® (Gist-Brocades); α and β amylases such as Purafect Ox Am® (Genencor) and Termamyl®, Ban®, Fungamyl®, Duramyl®, and Natalase® (Novo); pectinases; and mixtures thereof. Enzymes are preferably added herein as prills, granulates, or cogranulates at levels typically in the range from about 0.0001% to about 2% pure enzyme by weight of composition.

Bleaching Agent

Bleaching agents suitable herein include oxygen (especially in the primary composition) and chlorine (especially in the secondary composition) bleaches. Preferred oxygen bleaches are inorganic perhydrate salts such as sodium perborate mono-and tetrahydrates and sodium percarbonate optionally coated to provide controlled rate of release (see, for example, GB-A-1466799 on sulfate/carbonate coatings), preformed organic peroxyacids and mixtures thereof with organic peroxyacid bleach precursors and/or transition metal-containing bleach catalysts (especially manganese or cobalt). Inorganic perhydrate salts are typically incorporated at levels in the range from about 1% to about 40% by weight, preferably from about 2% to about 30% by weight and more preferably from abut 5% to about 25% by weight of composition. Peroxyacid bleach precursors preferred for use herein include precursors of perbenzoic acid and substituted perbenzoic acid; cationic peroxyacid precursors; peracetic acid precursors such as TAED, sodium acetoxybenzene sulfonate and pentaacetylglucose; pemonanoic acid precursors such as sodium 3,5,5-trimethylhexanoyloxybenzene sulfonate (iso-NOBS) and sodium nonanoyloxybenzene sulfonate (NOBS); amide substituted alkyl peroxyacid precursors (EP-A-0170386); and benzoxazin peroxyacid precursors (EP-A-0332294 and EP-A-0482807). Bleach precursors are typically incorporated at levels in the range from about 0.5% to about 25%, preferably from about 1% to about 10% by weight of composition while the preformed organic peroxyacids themselves are typically incorporated at levels in the range from 0.5% to 25% by weight, more preferably from 1% to 10% by weight of composition. Bleach catalysts preferred for use herein include the manganese triazacyclononane and related complexes (U.S. Pat. No. 4,246,612, U.S. Pat. No. 5,227,084); Co, Cu, Mn and Fe bispyridylamine and related complexes (U.S. Pat. No. 5,114,611); and pentamine acetate cobalt(III) and related complexes (U.S. Pat. No. 4,810,410).

Chlorine bleach is preferred for use in the secondary composition, especially as agent for reducing spotting. Chlorine bleach greatly improves cleaning performance, in particular it remove stains left by tea, coffee or fruit juices. Chlorine bleach is also very good in the removal of protein films from dishware/tableware caused by soil food or by enzymes deposition. Additionally chlorine bleach is an excellent sanitizer and germicide. Chlorine bleaching agents preferred for use herein are those which yield a hypochlorite species in aqueous solutions including alkali metal and alkaline earth metal hypochlorites, hypochlorite addition products, chloramines, chlorimines, chloramides, and chlorimides. Specific examples of compounds of this type include sodium hypochlorite, potassium hypochlorite, monobasic calcium hypochlorite, dibasic magnesium hypochlorite, chlorinated trisodium phosphate dodecahydrate, potassium dichloroisocyanurate, sodium dichloroisocyanurate, sodium dichloroisocyanurate dihydrate, trichlorocyanuric acid, 1,3-dichloro-5,5-dimethylhydantoin, N-chlorosulfamide, Chloramine T, Dichloramine T, Chloramine B and Dichloramine B. A preferred bleaching agent for use in the compositions of the instant invention is sodium dichloroisocyanurate.

Bleach Scavenger

A scavenger is useful to substantially reduce the presence of a free chlorine source, HOCl and other oxidizing chlorine containing sources to $Cl^-$ ions or to substantially reduce hydrogen peroxide or peroxy acid bleaches to non-oxidizing species in order to protect dishware/tableware from corrosion, especially metallic articles and in particular silver articles, such as crockery.

Useful scavengers include amines, preferably primary and secondary amines, including primary and secondary fatty amines, and alkanolamines; ammonium salts; amine functional polymers; amino acid homopolymers with amino groups and their salts, such as polyarginine, polylysine, polyhistidine; amino acids and their salts, preferably those having more than one amino group per molecule. Other suitable scavengers include sulfur-oxyacids and salts thereof such as the alkali metal and ammonium salts of sulfur-oxyacids including sodium bisulfite ($NaHSO_3$), ammonium sulfite ($(NH_4)_2SO_3$), sodium sulfite ($Na_2SO_3$) sodium thiosulfite ($Na_2S_2O_3$), sodium metabisulfite ($Na_2S_2O_3$), potassium metabisulfite ($K_2S_2O_5$), lithium hydrosulphite ($Li_2S_2O_4$), or other reducing agents potassium iodide (KI), ferrous ammonium sulfate [$Fe(NH_4SO_4)_2$]. A preferred scavenger for chlorine is sodium bisulfite. Other useful chlorine scavengers which can be used are tris (hydroxymethyl) aminomethane, 2-amino-2-methyl-1,3-propanediol, 2-amino-2-ethyl-1,3-propanediol, 2-amino-1-butanol, 1-amino-2-propanol, 2-amino-1-propanol, and 2-amino-2-methyl-1-propanol. Preferred for use herein are antioxidants such as ascorbic acid, carbamate, phenols and mixtures thereof, especially preferred for use in the finishing composition is ascorbic acid. Suitable levels of bleach scavenger for use here in are from 0.01% to 5% by weight of the composition, preferably from 0.1% to 0.5%.

Low Cloud Point Non-ionic Surfactants and Suds Suppressers

The suds suppressers suitable for use herein include nonionic surfactants having a low cloud point. "Cloud point", as used herein, is a well known property of nonionic surfactants which is the result of the surfactant becoming less soluble with increasing temperature, the temperature at which the appearance of a second phase is observable is referred to as the "cloud point" (See Kirk Othmer, pp. 360–362). As used herein, a "low cloud point" nonionic surfactant is defined as a nonionic surfactant system ingredient having a cloud point of less than 30° C., preferably less than about 20° C.; and even more preferably less than about 10° C. and most preferably less than about 7.5° C. Typical low cloud point nonionic surfactants include nonionic alkoxylated surfactants, especially ethoxylates derived from primary alcohol, and polyoxypropylene/polyoxyethylene/polyoxypropylene (PO/EO/PO) reverse block polymers. Also, such low cloud point nonionic surfactants include, for example, ethoxylated-propoxylated alcohol (e.g., BASF Poly-Tergent® SLF18) and epoxy-capped poly(oxyalkylated) alcohols (e.g., BASF Poly-Tergent® SLF18B series of nonionics, as described, for example, in U.S. Pat. No. 5,576,281).

Preferred low cloud point surfactants are the ether-capped poly(oxyalkylated) suds suppresser having the formula:

$$R^1O-(CH_2-\underset{\displaystyle R^2}{\underset{|}{CH}}-O)_x-(CH_2-CH_2-O)_y-(CH_2-\underset{\displaystyle R^3}{\underset{|}{CH}}-O)_z-H$$

wherein $R^1$ is a linear, alkyl hydrocarbon having an average of from about 7 to about 12 carbon atoms, $R^2$ is a linear, alkyl hydrocarbon of about 1 to about 4 carbon atoms, $R^3$ is a linear, alkyl hydrocarbon of about 1 to about 4 carbon atoms, x is an integer of about 1 to about 6, y is an integer of about 4 to about 15, and z is an integer of about 4 to about 25.

Other low cloud point nonionic surfactants are the ether-capped poly(oxyalkylated) having the formula:

$$R_IO(R_{II}O)_nCH(CH_3)OR_{III}$$

wherein, $R_I$ is selected from the group consisting of linear or branched, saturated or unsaturated, substituted or unsubstituted, aliphatic or aromatic hydrocarbon radicals having from about 7 to about 12 carbon atoms; $R_{II}$ may be the same or different, and is independently selected from the group consisting of branched or linear $C_2$ to $C_7$ alkylene in any given molecule; n is a number from 1 to about 30; and $R_{III}$ is selected from the group consisting of:

(i) a 4 to 8 membered substituted, or unsubstituted heterocyclic ring containing from 1 to 3 hetero atoms; and (ii) linear or branched, saturated or unsaturated, substituted or unsubstituted, cyclic or acyclic, aliphatic or aromatic hydrocarbon radicals having from about 1 to about 30 carbon atoms;

(b) provided that when $R^2$ is (ii) then either: (A) at least one of $R^1$ is other than $C_2$ to $C_3$ alkylene; or (B) $R^2$ has from 6 to 30 carbon atoms, and with the further proviso that when $R^2$ has from 8 to 18 carbon atoms, R is other than $C_1$ to $C_5$ alkyl.

Sulfonated Anti-scaling Polymer

Sulfonated anti-scaling polymers are suitable for use herein in any of the primary or secondary cleaning compositions or the finishing composition. The product can comprise form about 0.5 to 6%, preferably from about 3.5 to about 5% by weight of the composition of the polymer. The polymer generally comprises from about 0.1% to about 90%, preferably from about 1% to about 30% by weight of a sulfonic acid containing monomer. Examples of sulfonate monomers include, but are not limited to, allyl hydroxypropanyl sulfonate ethers, allylsulfonic acids, methallylsulfonic acids, styrene sulfonic acids, vinyl toluene sulfonic acids, acrylamido alkane sulfonic acids, allyloxybenzene sulfonic acids, 2-alkylallyloxybenzene sulfonic acids such as 4-sulfophenol methallyl ether, and the alkali or alkaline earth metal or ammonium salts thereof.

Suitable examples of scale-inhibiting copolymers include, but are not limited to tetrapolymers of 4-sulfophenol methallyl ether, sodium methallyl sulfonate, acrylic acid and methyl methacrylate. The monomer unit, sulfophenol methallyl ether, has the formula:

$$CH_2{=}C(CH_3)CH_2OC_6H_4SO_3M$$

where M represents hydrogen, alkali metal, alkaline earth metal or ammonium ions.

Other suitable examples of scale-inhibiting copolymers include, but are not limited to, a copolymer of acrylic acid and 4-sulfophenol methallyl ether; a copolymer of acrylic acid and 2-acrylamido-2-methylpropane sulfonate; a terpolymer of acrylic acid, 2-acrylamido- 2-methylpropane sulfonate and sodium styrene sulfonate; a copolymer of acrylic acid and vinyl pyrrolidone; a copolymer of acrylic acid and acrylamide; and a polymer of sulfophenyl methallyl ether, sodium methallyl sulfonate, acrylic acid, methyl methacrylate and 2-acrylamido-2-methyl propane sulfonic acid.

Preferably, the polymer is the tetrapolymer of 4-sulfophenol methallyl ether, sodium methallyl sulfonate, acrylic acid and methyl methacrylate. Preferred for use herein are copolymers comprising polyacrylic acid, methyl methacrylate, sulfophenol methallyl ether and sodium methallyl sulfonate.

Preferred commercial available copolymers include: Alcosperse 240, Aquatreat AR 540 and Aquatreat MPS supplied by Alco Chemical; Acumer 3100 and Acumer 2000 supplied by Rohm & Haas; Goodrich K-798, K-775 and K-797 supplied by BF Goodrich; ACP 1042 supplied by ISP technologies Inc.; and polyacrylic acid/acrylamide supplied by Aldrich. A particularly preferred copolymer is Alcosperse 240 supplied by Alco Chemical.

Surface Substantive Modifying Polymer

Preferably the surface substantive polymer is selected from the group consisting of homo and copolymers of polyvinyl pyrrolidone (PVP), suitable levels for use herein are from about 0.001 to about 10%, preferably from about 0.01 to about 1% by weight of the dishwashing product and at from about 1 to about 200, preferably from about 20 to about 100 ppm in the rinse liquor. In general terms such homo and copolymers can have an average molecular weight (eg as measured by light scattering) in the range from about 1,000 to about 5,000,000, preferably from about 5,000 to about 500,000. In addition, preferred copolymers comprise at least about 5%, most preferably at least about 15%, especially at least about 40% by weight thereof of the comonomer. Highly preferred comonomers include aromatic monomers such as vinyl imidazole and carboxylic monomors such as acrylic acid and methacrylic acid.

Suitable polyvinylpyrrolidones are commercially available from ISP Corporation, New York, N.Y. and Montreal, Canada under the product names PVP K-15, PVP K-30, PVP K-60 and PVP K-90. Other suitable polyvinylpyrrolidones which are commercially available from BASF Corporation include Sokalan HP 165 and Sokalan HP 12. Other polyvinylpyrrolidones known to persons skilled in the detergent field, see for example EP-A-262,897 and EP-A-256,696, are also suitable.

A particularly preferred copolymer of polyvinyl pyrrolidone is N-vinylimidazole N-vinylpyrrolidone (PVPVI) polymers available from for example BASF under the trade name Luvitec VP155K18P. Another suitable PVP copolymer is a quaternized PVPVI, for example, the compound sold under the tradename Luvitec Quat 73W by BASF.

Other suitable copolymers of vinylpyrrolidone for use in the compositions of the present invention are copolymers of polyvinylpyrrolidone and acrylic acid or methacrylic acid.

Other suitable components herein include organic polymers having dispersant, anti-redeposition, soil release or other detergency properties invention in levels of from about 0.1% to about 30%, preferably from about 0.5% to about 15%, most preferably from about 1% to about 10% by weight of composition. Preferred anti-redeposition polymers herein include acrylic acid containing polymers such as Sokalan PA30, PA20, PA15, PA10 and Sokalan CP10 (BASF GmbH), Acusol 45N, 480N, 460N (Rohm and Haas), acrylic acid/maleic acid copolymers such as Sokalan CP5 and acrylic/methacrylic copolymers. Preferred soil release polymers herein include alkyl and hydroxyalkyl celluloses (U.S. Pat. No. 4,000,093), polyoxyethylenes, polyoxypropylenes and copolymers thereof, and nonionic and anionic polymers based on terephthalate esters of ethylene glycol, propylene glycol and mixtures thereof.

Heavy metal sequestrants and crystal growth inhibitors are suitable for use herein in levels generally from about 0.005% to about 20%, preferably from about 0.1% to about 10%, more preferably from about 0.25% to about 7.5% and most preferably from about 0.5% to about 5% by weight of composition, for example diethylenetriamine penta (methylene phosphonate), ethylenediamine tetra(methylene phosphonate) hexamethylenediamine tetra(methylene phosphonate), ethylene diphosphonate, hydroxy-ethylene-1,1-diphosphonate, nitrilotriacetate, ethylenediaminotetracetate, ethylenediamine-N,N'-disuccinate in their salt and free acid forms.

The compositions herein can contain a corrosion inhibitor such as organic silver coating agents in levels of from about 0.05% to about 10%, preferably from about 0.1% to about 5% by weight of composition (especially paraffins such as Winog 70 sold by Wintershall, Salzbergen, Germany), nitrogen-containing corrosion inhibitor compounds (for example benzotriazole and benzimadazole—see GB-A-1137741) and Mn(II) compounds, particularly Mn(II) salts of organic ligands in levels of from about 0.005% to about 5%, preferably from about 0.01% to about 1%, more preferably from about 0.02% to about 0.4% by weight of the composition.

Other suitable components herein include colorants, water-soluble bismuth compounds such as bismuth acetate and bismuth citrate at levels of from about 0.01% to about 5%, enzyme stabilizers such as calcium ion, boric acid, propylene glycol and chlorine bleach scavengers at levels of from about 0.01% to about 6%, lime soap dispersants (see WO-A-93/08877), suds suppressors (see WO-93/08876 and EP-A-0705324), polymeric dye transfer inhibiting agents, optical brighteners, perfumes, fillers and clay.

Liquid detergent compositions can contain low quantities of low molecular weight primary or secondary alcohols such as methanol, ethanol, propanol and isopropanol can be used in the liquid detergent of the present invention. Other suitable carrier solvents used in low quantities includes glycerol, propylene glycol, ethylene glycol, 1,2-propanediol, sorbitol and mixtures thereof.

Trigger-means

The trigger-means used herein are specific for each zone of the product.

Primary Cleaning Trigger Means

The function of the primary trigger cleaning means is to protect the primary cleaning zone from premature dissolution especially during the pre-wash, either as the results of water leaking into the dispenser or from the wash water itself for the case in which the product is placed in the drum of the machine or outside the dispenser. According, the primary trigger enables delivery of the primary cleaning composition at the appropriate point of the main-wash. For optimum performance of the primary composition, sometimes is desirable to deliver the composition when the washing water has reached above a certain temperature (most of the ingredients of the composition present optimum performance above 40° C., delivery of the ingredients before reaching this temperature can sometimes be wasteful). A suitable trigger means for the primary cleaning zone is a temperature-dependent trigger means, such as for example materials which are substantially insoluble in cold water and soluble in warm water. The material can optionally have a trigger delay of less than about 4 min, preferably less than about 2, trigger delay for example being set by the thickness of a film material. The combination of trigger-temperature and dissolution delay can give a very precise control of the point in which the primary composition is delivered.

Preferably the primary trigger material has a water solubility according to the hereinbelow defined test of less than about 50%, more preferably less than about 20% and especially less than about 5% under cold water conditions (20° C. or below) when exposed to the water for at least 10 minutes, preferably at least 15 minutes; and a water solubility of at least about 50%, more preferably at least about 75% and especially at least about 95% under warm water conditions (30° C. or above, preferably 40° C. or above) when exposed to the water for about 5 minutes and preferably when exposed to the water for about 3 minutes. Such trigger materials are herein referred to as being substantially insoluble in cold water but soluble in warm water. Sometimes this is abbreviated simply to "warm water soluble". Apart from providing precise controlled release, this kind of material also solves the problem of gelling when handling the product with wet hands.

50 grams±0.1 gram of pouch material is added in a pre-weighed 400 ml beaker and 245 ml±1 ml of distilled water is added. This is kept at the desired temperature, by using a water bath, and stirred vigorously on a magnetic stirrer set at 600 rpm, for the desired time. Then, the mixture is filtered through a folded qualitative sintered-glass filter with a maximum pore size of 20 μm. The water is dried off from the collected filtrate by any conventional method, and the weight of the remaining material is determined (which is the dissolved or dispersed fraction). Then, the % solubility or dispersability can be calculated.

Preferred primary trigger materials for use herein are commercially available polyvinyl alcohols (PVA) obtained by hydrolysis of polyvinyl acetates. The solubility of these films can be selectively adjusted by the degree of hydrolysis of the PVA or by using a cross-linking agent. Examples of commercially available PVA suitable for use herein are BP26 available from Aicello, L10 and L15 available from Aquafilm, VF-M and VM-S available from Kuraray and E-2060 available from Monosol, especially preferred for use herein is BP26 available from Aicello. The thickness of the film can influence the dissolution kinetics, films having a thickness between about 5 and about 100 μm being preferred for use herein.

Secondary Cleaning Trigger Means

The function of the secondary trigger cleaning means is to protect the secondary cleaning zone from dissolution during the main-wash and only permit the delivery of the composition during a pre-final rinse, preferably the first rinse cycle. The first rinse cycle is generally a cold cycle, so that if the main-wash is itself a cold-water fill, the secondary cleaning zone is exposed to the same temperature conditions at the beginning of the main-wash and during the first rinse cycle. The delivery of the secondary composition in the first rinse cycle is therefore accomplished by means of a primed secondary trigger means. This secondary trigger means is primed by a so-called secondary priming trigger, preferably a temperature-dependent priming trigger means which is responsive to the temperature conditions encountered during the hot stage of the main-wash cycle. The priming temperature ($T'_{sec}$) is preferably at least 40° C., more preferably at least 45° C., and especially at least 48° C.

Preferably the priming trigger material has a water solubility according to the hereinabove defined test of less than about 50%, more preferably less than about 20% and especially less than about 5% under cold water conditions (20° C. or below) when exposed to the water for at least 10 minutes, preferably at least 15 minutes; and a water solubility of at least about 50%, more preferably at least about 75% and especially at least about 95% under hot water conditions (40° C. or above, preferably 48° C. or above) when exposed to the water for about 5 minutes and preferably when exposed to the water for about 3 minutes. Such trigger materials are herein referred to as being substantially insoluble in cold water but soluble in hot water. Sometimes this is abbreviated simply to "hot water soluble".

Preferred priming trigger means for use herein are commercially available polyvinyl alcohols (PVA) obtained by hydrolysis of polyvinyl acetates. The solubility of these films can be selectively adjusted by the degree of hydrolysis of the PVA or by using a cross-linking agent. Examples of commercially available PVA suitable for use herein are LA25, LA38 available from Aicello, A127 and L15 available from Aquafilm, Hi-Selon and H-221 available from Nippon Goshei and M1000, M1030 and M1040 available from Monosol, especially preferred for use herein is M1030 available from Monosol. The thickness of the film can influence the dissolution kinetics, films having a thickness between about 5 and about 100 μm being preferred for use herein. The priming trigger material should be chosen to ensure that $T'_{sec}$ is greater than $T_{prim}$.

Other priming trigger means suitable for use herein include substances having a melting range which lies between about 40° C. and about 70° C. These substances include natural and synthetic waxes, paraffins (saturated aliphatic hydrocarbons) and mixtures thereof.

After the priming trigger means has been activated (generally when the main-wash water reaches a temperature above 40° C., preferably above 48° C.) the secondary trigger is in a primed condition such that it can itself be triggered by exposure to the hot temperature of the wash liquor. However the secondary trigger means is not activated until warm or low temperature is reached (less than about 40° C., preferably less than about 35° C., more preferably less than about 30° C.). Suitable materials for use as primed trigger means are inverse solubility temperature-dependent materials, such as for example, polymeric material comprising an inverse solubility polymer and polyvinyl alcohol in a ratio of at least 1:1, preferably at least 2:1 and more preferably at least about 3:1 and which can fulfil the requirement of being substantially insoluble above about 40° C. and substantially water soluble at temperatures below about 40° C. An inverse solubility polymer is defined as a polymer which is substantially insoluble in hot water and soluble in cold water. These materials usually have a low temperature gel point. This gel is very stable and once formed will be very difficult to break-up. Inverse solubility polymers can be selected from alkylated and/or hydroxyalkylated polysaccharides, cellulose ethers, polyisopropylacrylamide and mixtures thereof. Preferred for use herein is hydroxypropylmethylcellulose.

Finishing Trigger Means

The function of the finishing trigger means is to protect the finishing zone from dissolution during the first rinse cycle and only permit the delivery of the composition during the final rinse cycle. This finishing trigger means is preferably a temperature dependent trigger means. The trigger temperature ($T_{fin}$) is at least 45° C., preferably at least 48° C., more preferably at least 50° C.

Preferably the finishing trigger material has a water solubility according to the hereinabove defined test of less than about 50%, more preferably less than about 20% and especially less than about 5% under cold water conditions (20° C. or below) when exposed to the water for at least 10 minutes, preferably at least 15 minutes; and a water solubility of at least about 50%, more preferably at least about 75% and especially at least about 95% under hot water conditions (45° C. or above, preferably 48° C. or above, more preferably 50° C. or above) when exposed to the water for about 5 minutes and preferably when exposed to the water for about 3 minutes. Such trigger materials are herein referred to as being substantially insoluble in cold water but soluble in hot water. Sometimes this is abbreviated simply to "hot water soluble". Suitable materials for use as finishing trigger materials can be similar to those used for priming trigger means described herein above and also EF30 and EF35 supplied from Aicello. The trigger material should be chosen herein to ensure that $T_{fin}$ is greater than $T'_{sec}$. A preferred material for use herein is M1030 available from Monosol.

Other finishing trigger means suitable for use herein include substances having a melting range which lies between about 50° C. and about 75° C., preferably between about 60° C. and about 70° C. These substances include natural and synthetic waxes, paraffins (saturated aliphatic hydrocarbons) and mixtures thereof.

Pouches for use herein can be prepared according to methods known in the art, such as for example vacuum-forming, thermo-forming or a combination of both.

EXAMPLES

Abbreviations Used in Examples

In the examples, the abbreviated component identifications have the following meanings:

| | |
|---|---|
| Carbonate | Anhydrous sodium carbonate |
| STPP | Sodium tripolyphosphate anhydrous |
| HEDP | Hydroxyethanedimethylenephosphonic acid |
| Silicate | Amorphous Sodium Silicate ($SiO_2$:$Na_2O$ = from 2:1 to 4:1) |
| Percarbonate | Sodium percarbonate of the nominal formula $2Na_2CO_3.3H_2O_2$ |
| Amylase | α-amylase available from Novo Nordisk A/S |
| Protease | protease available from Genencor |
| NaDCC | Dichloroisocyanuric acid (Sodium Salt) |
| Plurafac 400 | $C_{13}$–$C_{15}$ mixed ethoxylated/propoxylated fatty alcohol with an average degree of ethoxylation of 3.8 and an average degree of propoxylation of 4.5, available from BASF |
| Plurafac 404 | $C_{13}$–$C_{15}$ mixed ethoxylated/propoxylated fatty alcohol with an average degree of ethoxylation of 4 and an average degree of propoxylation of 5, available from BASF |
| PVA | Polyvinyl alcohol of 13,000–23,000 molecular weight and hydrolysis level of 98% available from Aldrich |
| HPMC | Methocel 311 having a gelation temperature of 40–50° C. available from Dow |

Example 1

The composition of Table I is made in the form of a three-compartment pouch, the weight of the pouch being 24 g. A first pouch is formed from Monosol 1030 (finishing trigger means) containing the finishing composition. A second pouch is formed having two layers of different film materials, the inner layer is formed from a hand cast film having the final composition given in Table 2 (primed secondary trigger means) and the outer layer is formed from Monosol 1030 (priming trigger means). This pouch contains the secondary composition and the first pouch. A third pouch is formed from Aicello BP26 (primary cleaning trigger means) containing the primary composition and the second pouch.

A load of tableware and cutlery is washed in a Bosch Siemens 6032 dishwashing machine, operated in its normal 65° C. program having a 5 l wash water capacity, with the exemplified pouch. The pouch is placed in the dispenser of the dishwashing machine. The primary cleaning composition is released into the main wash, the secondary cleaning composition into the first rinse cycle and the finishing composition into the final rinse cycle. The washed load presents excellent cleaning, care and shine benefits.

TABLE 1

| | % by weight |
|---|---|
| Primary composition | |
| STPP | 20 |
| Silicate | 4 |
| Carbonate | 22 |
| Percarbonate | 4 |
| Amylase | 2 |
| Protease | 1 |
| Plurafac LF404 | 1 |
| Secondary composition | |
| NaDCC | 4 |
| STPP | 23 |
| Finishing composition | |
| Citric Acid | 17 |
| Plurafac 400 | 1.7 |
| Ascorbic acid | 0.3 |

TABLE 2

| Ingredients | % by weight |
|---|---|
| HPMC | 57 |
| PVA | 25 |
| Boric acid | 1 |
| Glycerol | 9 |
| Water | 8 |

The film was made by preparing an aqueous solution with the ingredients of Table 2 in the following manner: 4000 g of deionised water were weighed into a 5 litre glass beaker. The beaker was placed on a hotplate and the water stirred with a magnetic stirrer bar at 500 rpm. 32.4 g of PVA were added to the water. The temperature of the hotplate was set to 90° C. The beaker was covered with cling film to minimise evaporation during heating. When the solution temperature reached 90° C. (typically 2 hours) all of the PVA had dissolved and the heating was switched off. The solution was allowed to cool to 70° C. (stirring continuously) and then the cling film removed and 72 g of HPMC were added. The HPMC was allowed to disperse (typically 5 minutes). 32 g of Boric acid solution (4% by weight in deionised water) was then added followed by 12 g of glycerol. The beaker was then covered again with cling film and allowed to cool further. As the temperature dropped below approximately 45° C. the solution began to thicken significantly as the HPMC dissolved. The solution was kept stirring for approximately 3 hours while cooling. The beaker was removed from the hotplate/stirrer and placed in an oven at 40° C. overnight.

The solution was cast in the following manner: The solution, glass plates and a casting bar were stored in an oven at 40° C. A glass plate at 40° C. was taken and the surface was coated with a thin layer of paraffin oil (Winog 70) by applying with a tissue and wiping off with a clean tissue. The casting bar (2 mm gap) at 40° C. was then placed at one end of the glass plate. The solution was then poured along the length of the casting bar keeping the pouring height to a minimum to prevent formation of air bubbles. The casting bar was then pushed along the length of the glass plate to leave a layer of solution 2 mm thick. The glass plate with solution coating was then placed in an oven at 40° C. to dry for 16–18 hours. After drying the resulting film was peeled away from the glass. The resulting film had a thickness of about 40 μm and contained about 7% moisture.

Example 2

The dishwashing operation is repeated as in Example 1 but the pouch, weighting 29 g, is placed on the floor of the dishwashing machine.

What is claimed is:

1. A pouch film material consisting of an outer layer of polyvinyl-alcohol film and an inner layer of a film of polymeric material which is water insoluble at temperatures above about 40° C., and water soluble at temperatures below about 40° C., wherein said inner layer polymeric film material is a mixture of an inverse solubility polymer selected from the group consisting of polyisopropylacrylamide, hydroxybutyl methylcellulose, and hydroxypropyl methylcellulose with polyvinyl alcohol in a weight ratio of inverse solubility polymer to polyvinyl alcohol of at least 1:1.

2. A pouch film material according to claim 1 wherein the inverse solubility polymer is hydroxypropyl methylcellulose.

* * * * *